US012627254B2

(12) United States Patent
Biggs et al.

(10) Patent No.:  US 12,627,254 B2
(45) Date of Patent:  May 12, 2026

(54) VEHICLE MOUNTED OR MOUNTABLE SOLAR PANEL ASSEMBLY AND SOLAR PANEL ASSEMBLY WITH A SEALED ELECTRICAL JUNCTION FOR A SOLAR PANEL

(71) Applicant: CANADUS POWER SYSTEMS, LLC, Twinsburg, OH (US)

(72) Inventors: Dan Biggs, Reminderville, OH (US); Andrew Hussey, Hinckley, OH (US); Andy Vanelzen, Uniontown, OH (US); Mario Pisano, Chagrin Falls, OH (US)

(73) Assignee: CANADUS POWER SYSTEMS, LLC, Twinsburg, OH (US)

( * ) Notice: Subject to any disclaimer, the term of this patent is extended or adjusted under 35 U.S.C. 154(b) by 402 days.

(21) Appl. No.: 18/311,735

(22) Filed: May 3, 2023

(65) Prior Publication Data

US 2023/0361718 A1      Nov. 9, 2023

Related U.S. Application Data

(60) Provisional application No. 63/338,166, filed on May 4, 2022.

(51) Int. Cl.
*H02S 30/20*          (2014.01)
*B60R 16/02*          (2006.01)
*B60R 16/03*          (2006.01)

(52) U.S. Cl.
CPC .......... *H02S 30/20* (2014.12); *B60R 16/0215* (2013.01); *B60R 16/03* (2013.01)

(58) Field of Classification Search
CPC ......... H02S 10/00–40; H02S 20/00–32; H02S 30/00–20

(Continued)

(56) References Cited

U.S. PATENT DOCUMENTS 5,280,133 A  *  1/1994  Nath ................. H01R 13/5216
                                                              361/752
10,224,870 B2      3/2019  Lester
                         (Continued)

FOREIGN PATENT DOCUMENTS

CN          201877450 U  *  6/2011
CN          202217679 U      5/2012
                    (Continued)

OTHER PUBLICATIONS

CN-207120801-U English (Year: 2018).*
CN-201877450-U English (Year: 2011).*

*Primary Examiner* — Bach T Dinh
(74) *Attorney, Agent, or Firm* — THOMPSON HINE LLP

(57)          ABSTRACT

A solar panel assembly includes a flexible solar panel having a front side and a rear side, with electrical leads protruding from the rear side; a mounting stud that extends from the flexible solar panel such that a portion of the mounting stud projects beyond the rear side of the flexible solar panel; a housing having a first side adjacent the rear side of the flexible solar panel, an opening at the first side through which the portion of the mounting stud projects so as to be positioned within an interior of the housing, a tab within the interior the housing, the tab receiving the portion of the mounting stud so as to form a mating connection with the portion of the mounting stud, the housing positioned such that the electrical leads protruding from the rear side of the flexible solar panel are positioned within the interior of the housing.

11 Claims, 11 Drawing Sheets

(58) Field of Classification Search
USPC ................................................. 136/243–265
See application file for complete search history.

(56) References Cited

U.S. PATENT DOCUMENTS

| | | | | |
|---|---|---|---|---|
| 2011/0114149 | A1* | 5/2011 | Li | H02S 40/34 |
| | | | | 136/244 |
| 2012/0249329 | A1* | 10/2012 | Sacchetti | H02S 40/34 |
| | | | | 340/568.1 |
| 2012/0266934 | A1 | 10/2012 | Tang | |
| 2013/0104982 | A1 | 5/2013 | Gonzalez | |
| 2013/0244503 | A1* | 9/2013 | Yamaguchi | H01R 13/41 |
| | | | | 439/733.1 |
| 2015/0188486 | A1 | 7/2015 | Marroquin | |
| 2017/0194900 | A1 | 7/2017 | Erben | |
| 2017/0373635 | A1 | 12/2017 | Perez | |
| 2019/0267938 | A1 | 8/2019 | Winger | |
| 2021/0297040 | A1 | 9/2021 | Sella | |
| 2021/0328545 | A1 | 10/2021 | Kim | |
| 2021/0344301 | A1 | 11/2021 | Gilchrist | |

FOREIGN PATENT DOCUMENTS

| | | | |
|---|---|---|---|
| CN | 207120801 U | * | 3/2018 |
| KR | 10-20150133594 | | 11/2015 |

* cited by examiner

VEHICLE MOUNTED OR MOUNTABLE SOLAR PANEL ASSEMBLY AND SOLAR PANEL ASSEMBLY WITH A SEALED ELECTRICAL JUNCTION FOR A SOLAR PANEL

TECHNICAL FIELD

The present disclosure relates to sealed junctions for enclosing electrical connections and more particularly to sealed junctions on solar panels supporting photovoltaic cells, such as vehicle mounted flexible solar panels.

BACKGROUND

Electrical junctions, and in particular electrical junction boxes, are commonly used to connect the leads of an electrical device to a cord or cable that supplies electrical power in the form of electrical current to the device. The junction boxes typically are adapted to be mounted on support structure and have ports or other openings through which electrical cables extend and are secured to relieve stress on the electrical connections between the electrical cables themselves within the junction boxes. Some junction boxes include removable covers that provide access to the interiors of the boxes to facilitate making the electrical connections to the enclosed electrical leads. In some embodiments, the openings to the boxes that receive the electrical cables to be connected include clamps that secure the cables to the box housings.

Junction boxes that are used outdoors also must be made weatherproof and resistant to environmental contaminants. This is frequently achieved by providing the junction box cover and openings with flexible, moisture-resistant gaskets that keep out rain and other precipitation, dust and other particulate contaminants, and insects. In particularly corrosive settings, such gasketing material preferably is made of ultraviolet-resistant material that also is capable of withstanding temperature extremes.

In a particular application, junction boxes are used to connect the output of an array of photovoltaic cells of a solar panel. A photovoltaic junction box is attached to the back of the solar panel and acts as an output interface. The individual photovoltaic cells typically are wired in series to achieve a desired voltage output. Strings of photovoltaic cells can be wired in parallel to achieve a desired amperage output. Multiple solar panels are frequently erected in "farms" that are away from interference with irradiation that might arise from buildings or other structures, and therefore it is desirable to make the electrical connections sufficiently robust to need only occasional maintenance. It is also desirable to provide robust electrical connections between the solar panel output and electrical cable in other applications, such as mounted on vehicles, building roofs, pole mounts, and ships. Accordingly, there is a need for an electrical junction for solar panels, particularly of the flexible type, that is weather, insect, and corrosion resistant, while at the same time providing a small footprint and effective connection to the solar panel. Since such electrical junction boxes are to be mass produced to accommodate a rapidly growing solar panel industry, the junction boxes may also preferably be comparatively inexpensive and simple to fabricate.

SUMMARY

In one aspect, a solar panel assembly includes a flexible solar panel having a front side via which light reaches photovoltaic cells of the flexible solar panel, and a rear side, with electrical leads protruding from the rear side; a mounting stud that extends from the flexible solar panel such that a portion of the mounting stud projects beyond the rear side of the flexible solar panel; a housing having a first side adjacent the rear side of the flexible solar panel, an opening at the first side through which the portion of the mounting stud projects so as to be positioned within an interior of the housing, a tab within the interior the housing, the tab receiving the portion of the mounting stud therethrough so as to form a mating connection with the portion of the mounting stud, the housing positioned to receive the electrical leads protruding from the rear side of the flexible solar panel within the interior of the housing, the housing having a second side with a second opening; a cable extending into the interior of the housing via the second opening, the cable carrying electrical conductors that are electrically connected with the electrical leads via connecting junctions; and a potting compound located within the interior of the housing and forming adhesive bonds with each of: (i) an interior surface of the housing, (ii) the connecting junctions between the electrical leads and the electrical conductors and (iii) the rear side of the flexible solar panel.

In another aspect, a solar panel assembly includes a flexible solar panel having a front side via which light reaches photovoltaic cells of the flexible solar panel, and a rear side, with electrical leads protruding from the rear side; a mounting stud that extends from the flexible solar panel such that a portion of the mounting stud projects beyond the rear side of the flexible solar panel; a housing having a first side adjacent the rear side of the flexible solar panel, an opening at the first side through which the portion of the mounting stud projects so as to be positioned within an interior of the housing, a tab within the interior the housing, the tab receiving the portion of the mounting stud therethrough so as to form a mating connection with the portion of the mounting stud, the housing positioned such that the electrical leads protruding from the rear side of the flexible solar panel are positioned within the interior of the housing.

In a further aspect, a vehicle mounted solar panel assembly includes a vehicle body component having an exterior surface, an interior surface and a hole therethrough; and a flexible solar panel assembly comprising: a flexible solar panel having a front side via which light reaches photovoltaic cells of the flexible solar panel, and a rear side, with electrical leads protruding from the rear side; a housing mounted at the rear side of the flexible solar panel, the housing defining an interior in which the electrical leads are located; a cable extending into the interior of the housing, the cable carrying electrical conductors that are electrically connected with the electrical leads via connecting junctions; wherein the flexible solar panel assembly is secured to the vehicle body component with the rear side of the flexible solar panel at the exterior surface of the vehicle body component and with the housing aligned with the hole such that the housing projects through the hole and the cable extends behind the vehicle body component.

Moreover, the present disclosure provides a sealed electrical junction for solar panels that is comparatively simple and inexpensive in construction and yet provides a robust hermetic seal about the electrical connection to keep out moisture and contaminants. The sealed electrical junction can be assembled quickly and is adaptable for mounting on the rear side of flexible solar panels or other substrates.

In one aspect, an electrical junction for attachment to a substrate includes at least one mounting stud that extends through the substrate; an open cylindrical cup having tabs for receiving the at least one mounting stud therethrough, the open cylindrical cup positioned over electrical leads protruding through the substrate into an interior of the open cylindrical cup, such that the electrical leads are exposed within the open cylindrical cup for electrical connection to an external conductor; and a potting compound located within the open cylindrical cup, the potting compound forming adhesive bonds with an interior surface of the open cylindrical cup, the electrical connection between the electrical leads and the external conductor, and with an exposed portion of the substrate in a base of the cup.

In another aspect, an electrical junction is disclosed for attachment to a substrate that supports a photovoltaic cell in which the substrate has at least one electrical lead extending from the photovoltaic cell through the substrate to a side of the substrate opposite the photovoltaic cell. The junction includes at least one mounting stud that extends through the substrate; an open cylindrical cup having tabs for receiving the at least one mounting stud therethrough making a mechanical connection therewith, the open cylindrical cup positioned on the substrate such that the at least one electrical lead extends into an interior thereof whereby the at least one electrical lead is electrically connected to an external conductor; and a potting compound located within the open cylindrical cup, the potting compound forming an adhesive bond with an interior surface of the open cylindrical cup, with the mounting stud, and with an exposed portion of the substrate in a base of the cup.

In yet another aspect, an electrical junction is described for attachment to a panel that supports a photovoltaic cell in which the panel has a pair of electrical leads extending from the photovoltaic cell through the panel to protrude from a side of the panel opposite the photovoltaic cell. The electrical junction includes a pair of mounting studs having ribbed shanks that extend through the panel; an open cylindrical cup positioned against the side of the panel opposite the photovoltaic cell, the open cylindrical cup having cars for receiving ribbed shanks of the mounting studs therethrough to mechanical connections therewith, the open cylindrical cup positioned on the substrate such that the electrical leads extend into an interior thereof whereby the electrical leads make an electrical connection to an external conductor protruding from the open cylindrical cup; and a potting compound located within the open cylindrical cup, the potting compound forming an adhesive bond with an interior surface of the open cylindrical cup, with the shanks of the mounting studs, with an exposed portion of the substrate in a base of the cup, and hermetically enclose the electrical connection between the electrical leads and the external conductor.

In still another aspect, a method for making an electrical junction for attachment to a substrate having at least one mounting stud extending from a front side of the substrate through the substrate to protrude from a rear side of the substrate is disclosed. The method includes placing an open cylindrical cup having tabs for receiving the at least one mounting stud therethrough over the electrical leads on the rear side of the substrate such that the electrical leads are exposed within the open cylindrical cup; extending at least one mounting stud through the substrate to protrude from the rear side of the substrate and engage the open cylindrical cup to form a mechanical connection therewith sufficient to hold the open cylindrical cup against the rear side of the substrate; making an electrical connection between the electrical leads and an external conductor within the open cylindrical cup; and placing a potting compound within the open cylindrical cup, thereby forming adhesive bonds between the potting compound and an interior surface of the open cylindrical cup, and with an exposed portion of the substrate in a base of the cup, and hermetically enclose the electrical connection between the electrical leads and the external conductor.

Other objects and advantages of the disclosed sealed electrical junction for a panel will be apparent from the following description, the accompanying drawings, and the appended statements of the invention.

DETAILED DESCRIPTION

Figure 1:
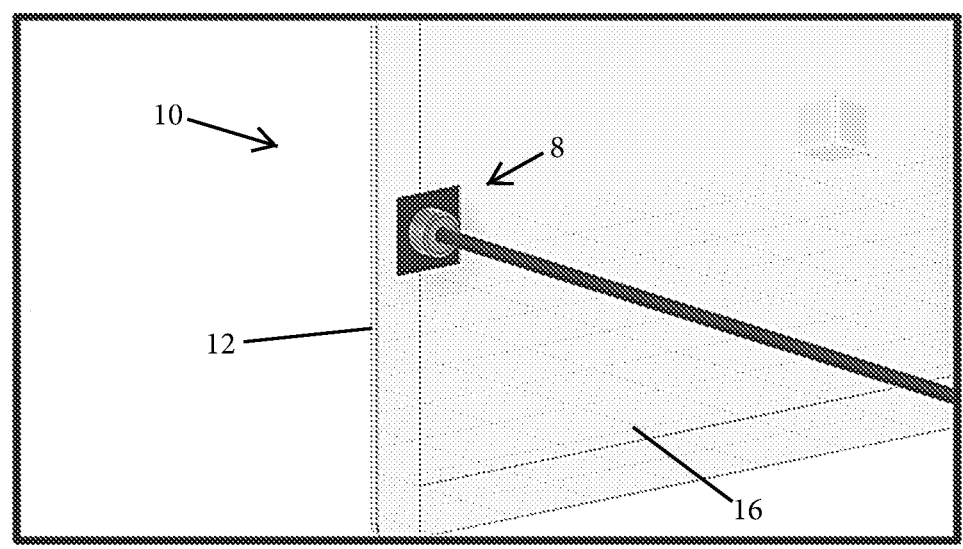
FIG. 1 is a rear perspective view of an exemplary embodiment of a flexible solar panel assembly including a sealed electrical junction.
Figure 2:
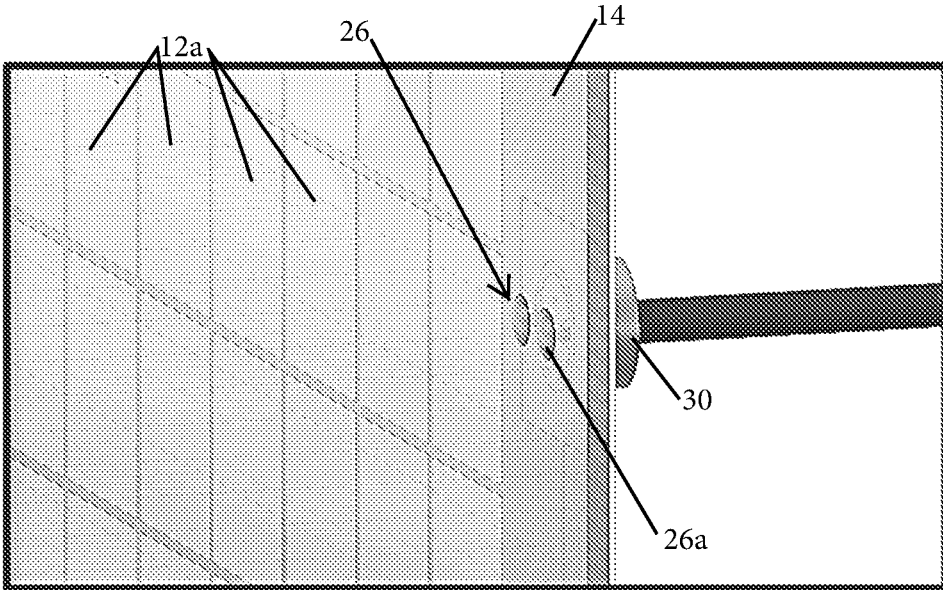
FIG. 2 is a front perspective view of FIG. 1.
Figure 3:
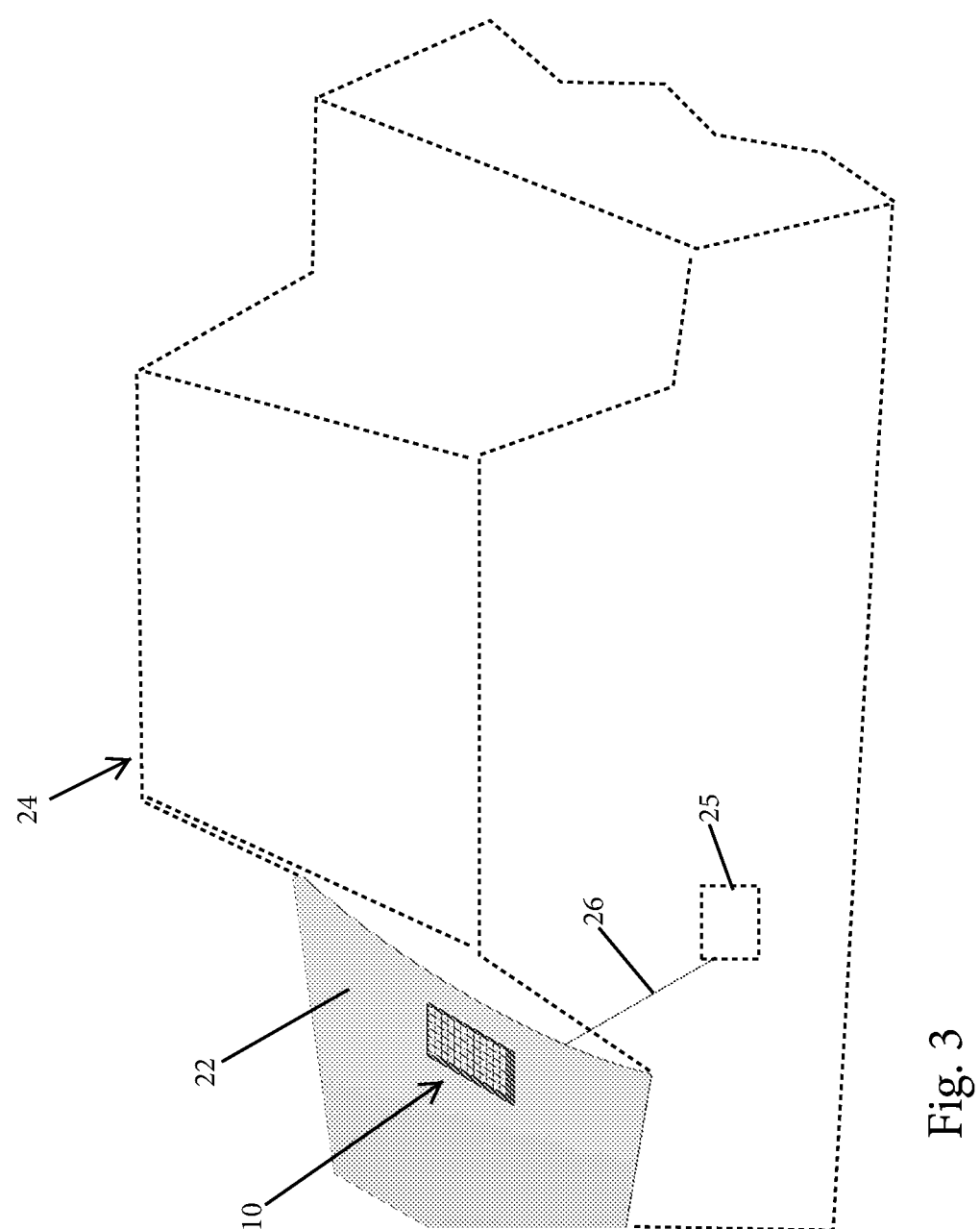
FIG. 3 is a perspective view of the flexible solar panel assembly mounted on a vehicle.
Figure 4:
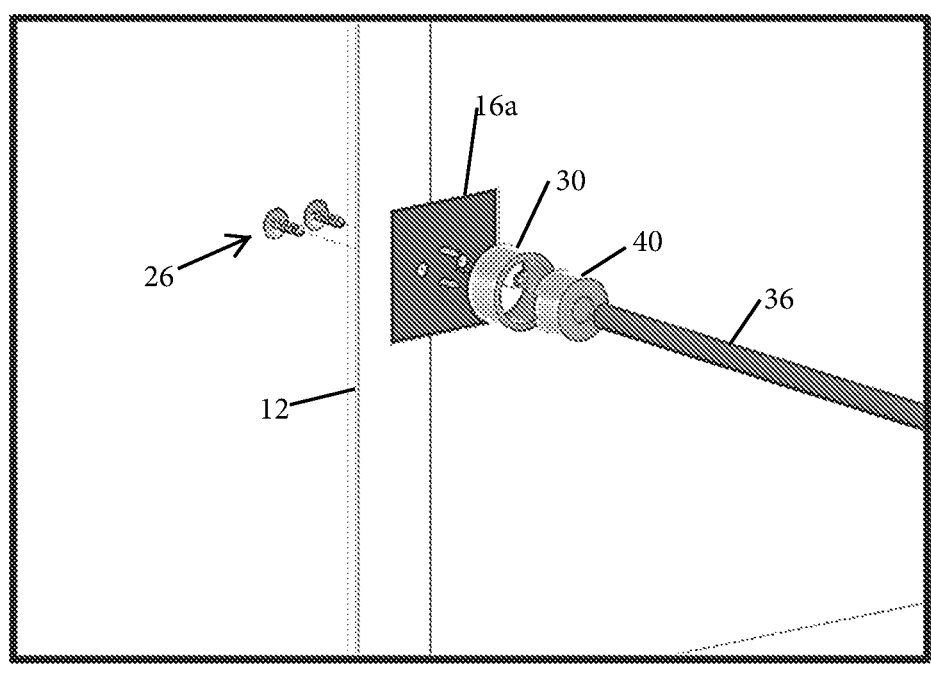
FIG. 4 is an exploded view of FIG. 1.
Figure 5:
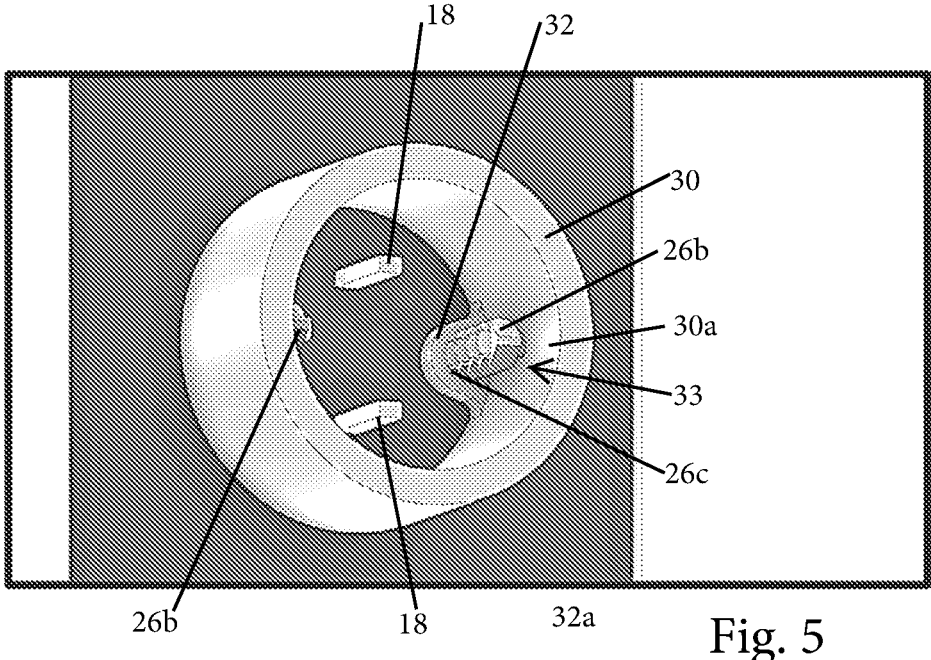
FIG. 5 is a perspective view of mounting studs engaging with tabs of a housing.
Figure 6A:
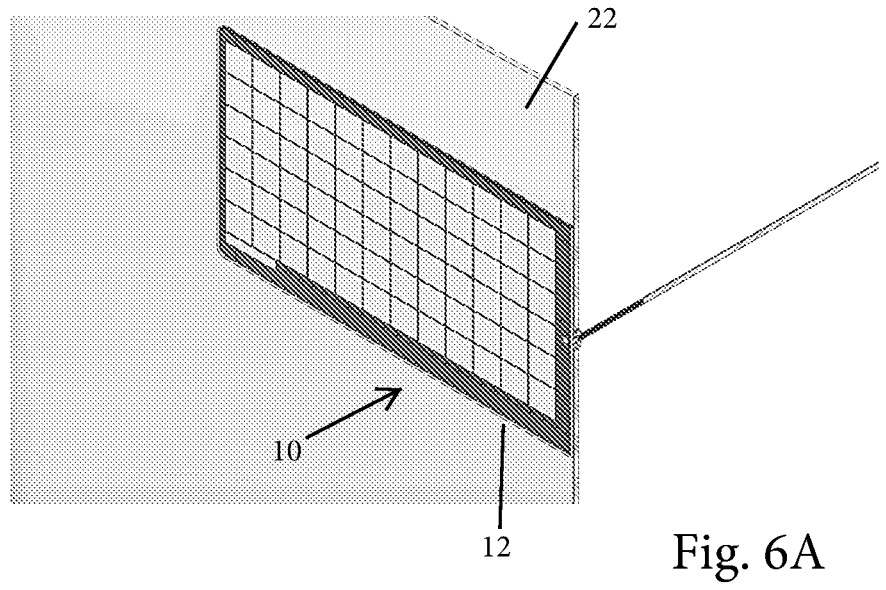
FIGS. 6A-6C are section views through the electrical junction of the vehicle mounted flexible solar panel assembly along a first plane.
Figure 7A:
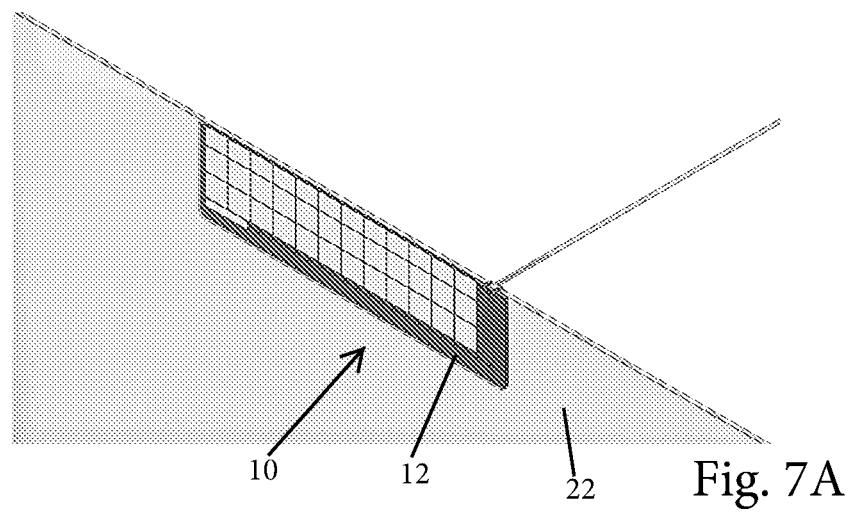
FIGS. 7A-7C are section views through the electrical junction of the vehicle mounted flexible solar panel assembly in a second plane that is perpendicular to the first plane.
Figure 6B:
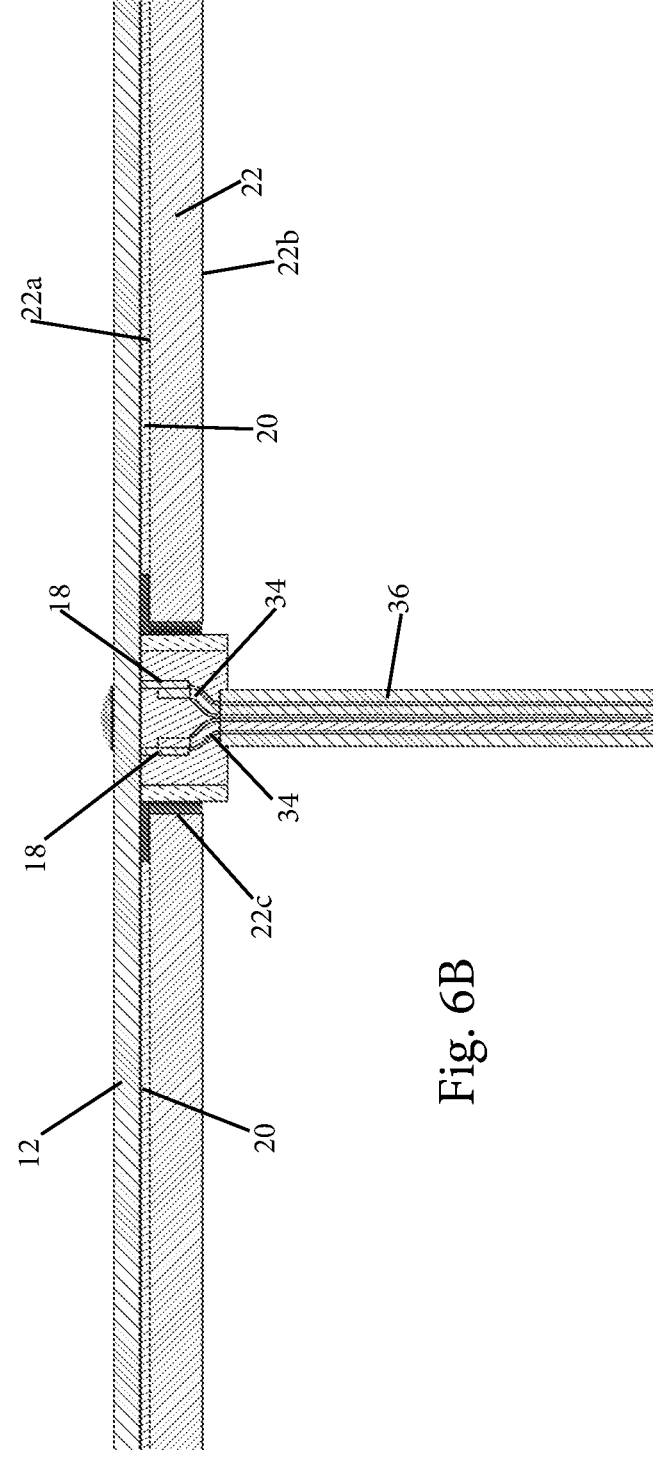
Figure 6C:
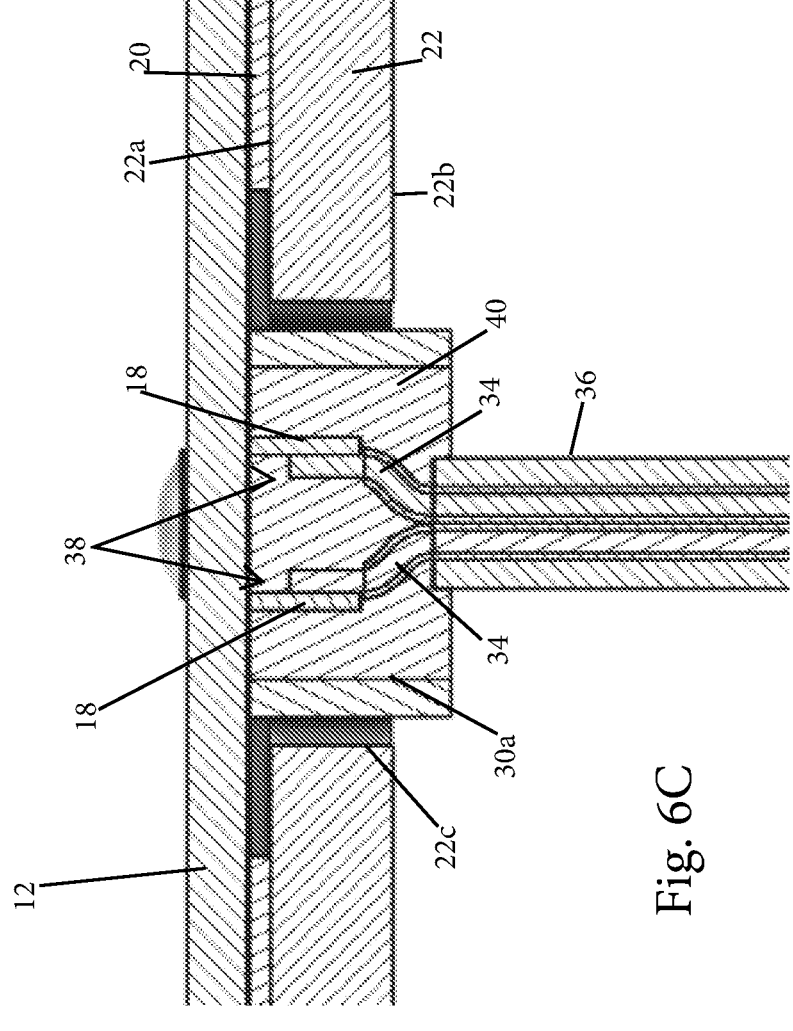
Figure 7B:
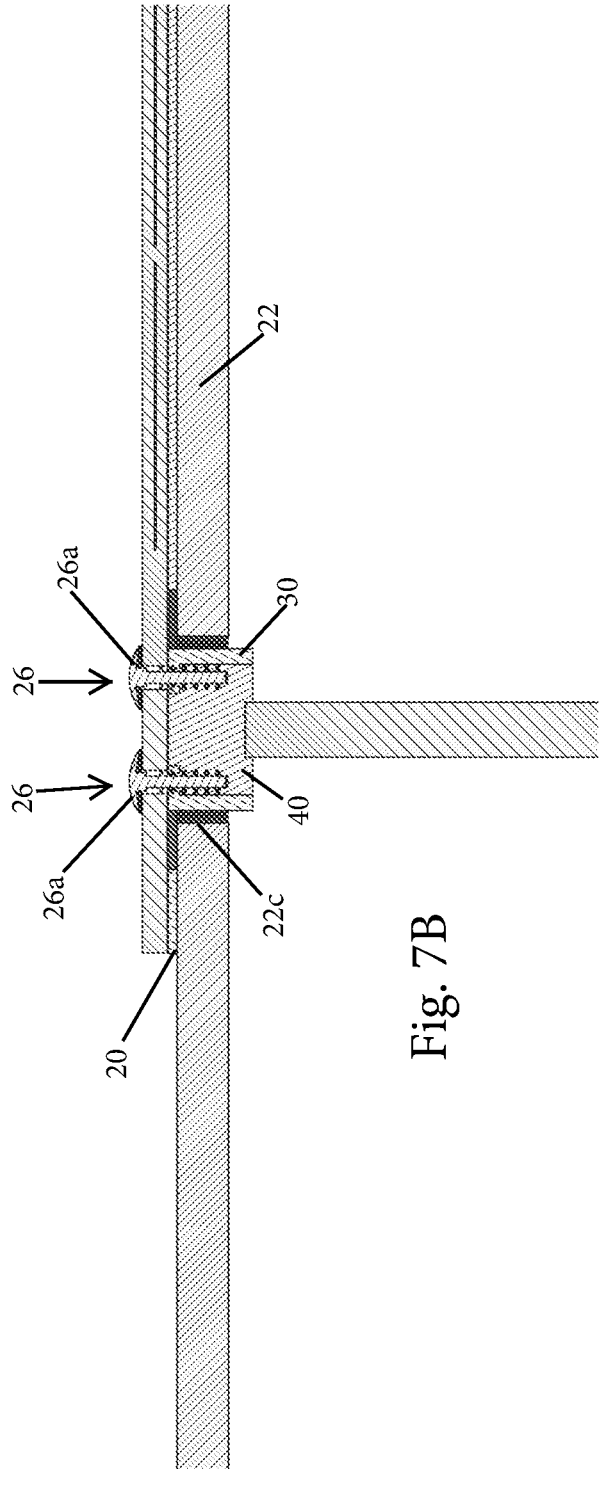
Figure 7C:
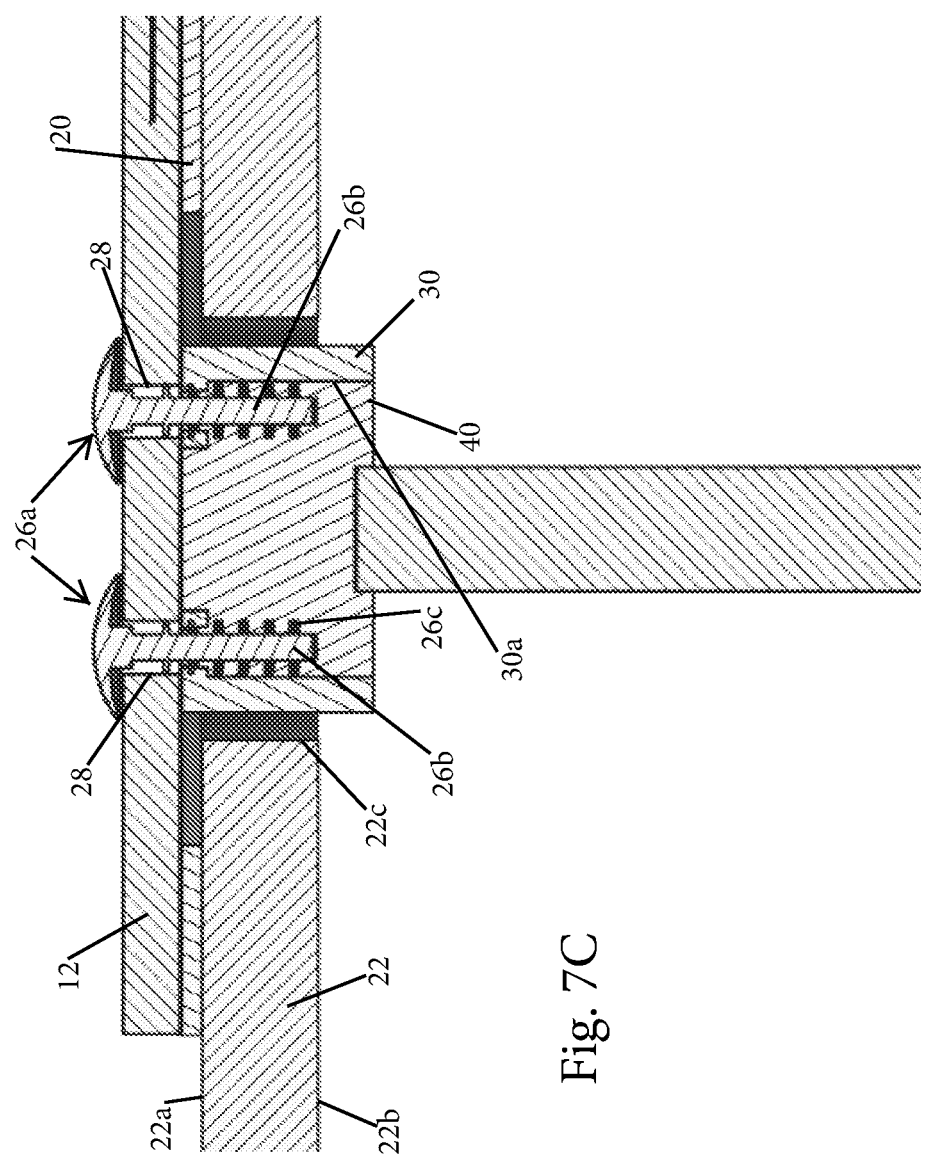
Figure 8:
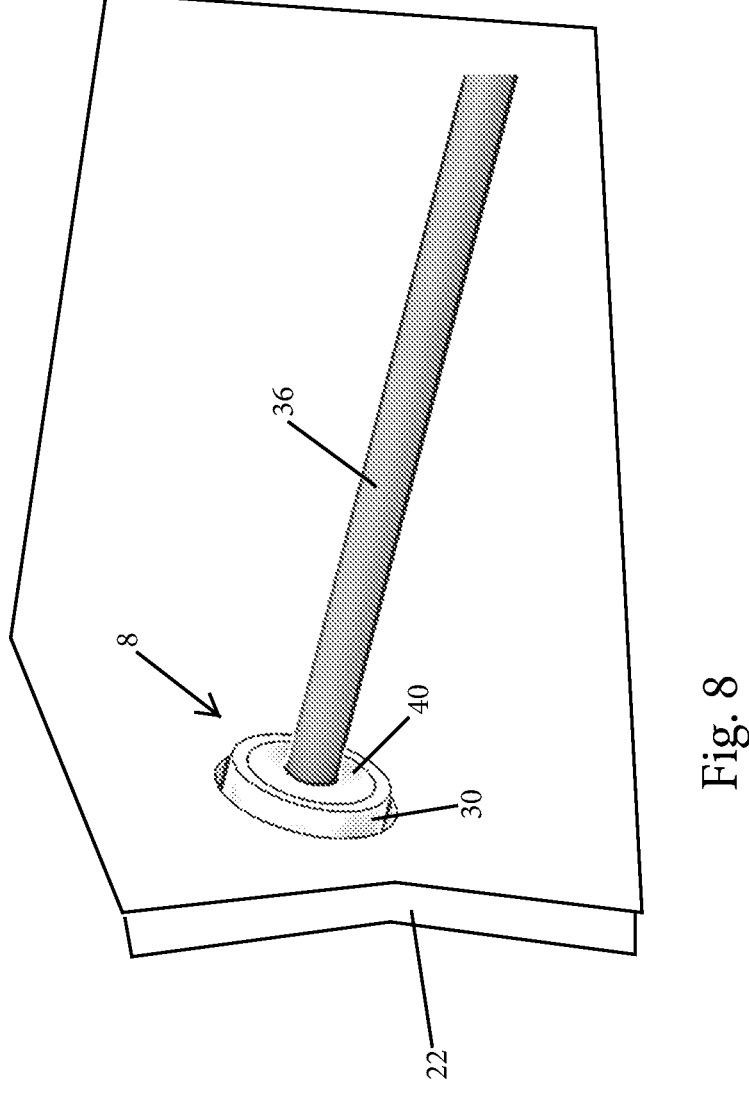
FIG. 8 is a partial perspective inner side view of the electrical junction of the vehicle mounted flexible solar panel assembly.

Referring to FIGS. 1-8, an exemplary embodiment of a flexible solar panel assembly 10 with an advantageous electrical junction 8 is shown and includes a flexible solar panel 12 having a front side 14 through which light reaches photovoltaic (PV) cells 12*a* of the flexible solar panel, and a rear side 16. By way of example, the flexible solar panel 12 may be a multi-layer laminate panel type construction with a top/front layer of flexible clear plastic laminate material and a bottom/rear layer of clear plastic laminate material sandwiching therebetween photovoltaic cells (aka solar cells) and buss wires that connect to or make up solar panel electrical leads 18 (e.g., in the form of terminals) protruding at the rear side of the flexible solar panel. The rear side may also include a flexible opaque plastic laminate material overlying the bottom/rear layer of clear plastic laminate material, and an adhesive tape/film 20 that can be used for mounting the flexible solar panel to a surface. In embodiments, a polyvinyl fluoride film supports an array of PV cells that are sandwiched between the layers. By way of example, in embodiments, such flexible solar panels may have a thickness of less than 20 mm, such as 10 mm or less.

The flexible configuration of the flexible solar panel 12 enables the flexible solar panel to conform to the surface to which it is mounted, such as mounting to a vehicle body component 22 of a vehicle 24. In embodiments, the vehicle body component 22 has an outer surface 22*a* and an inner surface 22*b*, with an opening 22*c* therethrough, and may, for example, be any of a hood or roof structure of a land or marine vehicle, or on an aircraft or spacecraft. In embodiments, a flexible solar panel may, for example, be sufficiently flexible to naturally conform to arcuate surfaces defined by a radius of curvature of six feet (although in implementations the radius may be smaller, such as four feet, three feet, or two feet) simply by laying the solar panel onto the arcuate surface and allowing gravity to cause the solar panel to conform to the shape of the surface.

The electrical junction 8 includes at least one mounting stud 26 (two mounting studs in the illustrated embodiment) that extends from the rear side of the flexible solar panel. In the illustrated embodiment, each mounting stud 26 includes a head 26a seated at the front side of the flexible solar panel and a shank portion 26b that extends through a hole 28 formed in the flexible solar panel, such that the shank portion protrudes from the rear side. In embodiments, the mounting studs 26 take the form of a plastic rivet with in which at least the projecting end of the shank portion 26b has rib projections 26c and the head portion 26a is flared/enlarged. Metal rivets or threaded screws could also be used. In some embodiments, the mounting stud 26 may be sufficiently hard so as to pierce the layers of the flexible solar panel 12 without creating a preformed hole. In embodiments, the surface of the head 26a adjacent to and seated against the front side of flexible solar panel may sealed and adhered to the front side of the flexible solar panel using a sealant, such as a curable sealant layer (e.g., a Chemlok® adhesive).

In embodiments, the electrical junction 8 includes a housing 30, which may take the form of an open-ended cylindrical cup or tube (e.g., a hollow cylinder, such as a hollow right-circular cylinder). In other embodiments, the housing 30 may be in the shape of an eccentric cylinder, a section of hollow pipe, and/or is polygonal in cross section, such as hexagonal. The housing 30 may be made of nylon, PVC or other polymer, such as a rigid polymer, or hard rubber. Here, the interior space of the housing includes mount tabs 32 with holes 32a sized to receive the shank portions 26b of the mounting studs 30 therethrough to form mating connections 33. Where the shank portions 26b include the ribbed projections 26c (e.g., a saw-toothed configuration), the relative sizing is such that the ribbed projections interact with the mount tabs 32 to inhibit pull-out of the shank portions 26b from the tab holes 32a, such as in a one-way locking fit. In embodiments, the housing includes a first open side/end abutting the rear side of the flexible solar panel, and the mount tabs 32 are located at the first open side/end as shown.

Rectangular region 16a at the rear side 16 represents an area where the adhesive tape/film has been removed at the rear side for the purpose of securing the housing 30 directly to the panel laminate, instead of the tape/film. In embodiments, regions 16a could be shaped to closely conform to and match the perimeter shape of the housing. In embodiments, the cylindrical end surface of the housing 30 that is adjacent to and seated against the rear side of flexible solar panel may sealed and adhered to the rear side using a sealant, such as a curable sealant layer (e.g., a Chemlok® adhesive).

The electrical leads 18 also protrude into the interior of the housing 30 and are electrically connected to conductors 34 of a cable 36 at connecting junctions 38. In embodiments, the connecting junctions may be formed by crimping, soldering, brazing, or combinations thereof, with soldering being the most typical. The resulting connecting junctions 38 are located within the interior of the housing 30, as is an end part the sheath or jacket of the cable 36 and the end parts of the insulation of the conductors 34. In embodiments, the cable 26 extends behind the vehicle body component 22 and is connected to a load or storage battery 25 of the vehicle 24.

Here, the electrical junction 8 includes a potting compound 40 located within (e.g., filling or substantially filling) the housing 30. The potting compound 40 forms adhesive bonds with each of (i) an interior surface 30a of the housing, (ii) the connecting junctions 38, (iii) the rear side 16 of the flexible solar panel 12, (iv) the mating connections 33 between the mounting studs and housing tabs and (v) the end portion of the sheath or jacket of the cable 36 and/or the end portions of the insulation of the conductors 34. In an embodiment, the potting compound 40 fills the housing 30 completely (i.e., to a level at least even with the distal rim of the housing), and the potting compound 40 completely encloses and hermetically seals the electrical connection between the leads 18 and the conductors 34 from moisture and ambient contaminants.

The potting compound 40 also encloses the shank portions 26b of the studs 26 and securely fixes them to the housing 30 and to the flexible solar panel 12. By way of example, the potting compound 40 is a sealant and may be selected from ethylene vinyl acetate, acrylic, polyvinyl butyral, polydimethylsiloxane, polyisobutylene, polyolefin, thermoplastic polyurethane, polyurethane, acrylic foam tape, epoxy, silicone, or ionomer, and may be a liquid sealant, such as a silicone-based sealant. When the sealant dries/cures, it may become rigid or semi-rigid. In one implementation, the potting compound may be a two part epoxy system, such as LOCTITE® 3145/3165.

In embodiments, the potting compound 40 of the electrical junction 8 performs multiple functions. The potting compound 40 envelops, protects, and hermetically seals the connecting junctions 38 between the electrical leads 18 and the conductors 34 from external contaminants. The potting compound 40 bonds to the interior surface 30a of the housing and the rear side of the flexible solar panel within the internal perimeter of housing to attach the electrical junction to the flexible solar panel. The potting compound 40 bonds to the shank portions 26b of the mounting studs 30 to hold them in place within the housing and thereby provide a second attachment mechanism to secure the electrical junction 8 to the substrate 12. The potting compound 40 bonds to the end of the cable 36 to limit any stresses on the connecting junctions 38 that could be caused by pulling on the cable 36 and/or conductor insulation (e.g., acting as a strain relief to inhibit the cable 38 from being pulled out of the housing 30 and/or inhibit weakening of the connecting junctions 38).

In an embodiment, the disclosed electrical junction 8 includes a method for making the electrical junction 8. In a particular embodiment, the method is for attachment of the electrical junction 8 to a flexible solar panel 12 (or other substrate) having at least one mounting stud 26 extending from a front side 14 of the flexible solar panel 12 through the flexible solar panel 12 to protrude from a rear side 16 of the flexible solar panel. In an exemplary embodiment, the method includes placing an open cylindrical housing 30 having tabs 32 for receiving the at least one mounting stud therethrough over at least one electrical lead 18 on the rear side 16 of the flexible solar panel 12 such that the electrical leads are exposed within the housing.

The at least one mounting stud 18 is inserted through the flexible solar panel 12 to protrude from the rear side 16 and engage the housing 30 to form a mechanical connection therewith sufficient to hold the housing against the rear side of the substrate. Electrical connections are made between the electrical leads 18 and external conductors 34 within the housing 30. The housing is then filled with a potting compound 40, thereby forming adhesive bonds between the potting compound and an interior surface 30*a* of the housing, and with an exposed portion of the rear side 16 of the flexible solar panel 12 in a base of the housing, and hermetically encloses the connecting junctions 38 between the leads 18 and the external conductors 34.

Figure 9A:
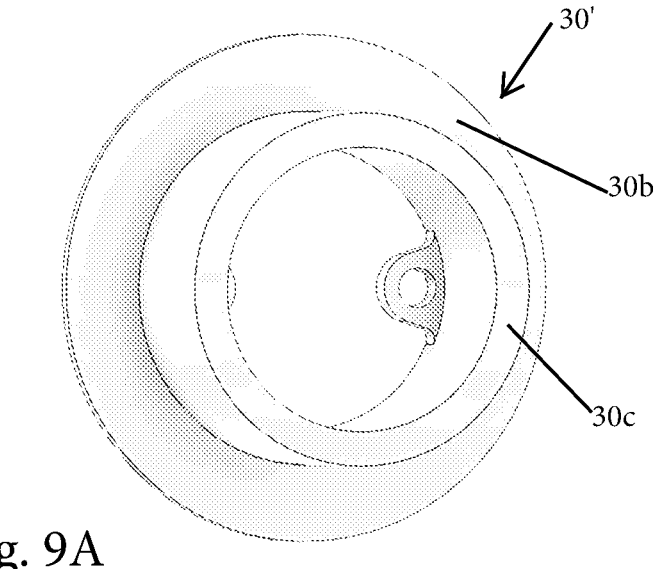
FIGS. 9A and 9B show an alternative embodiment of a housing for use in the flexible solar panel assembly.
Figure 9B:
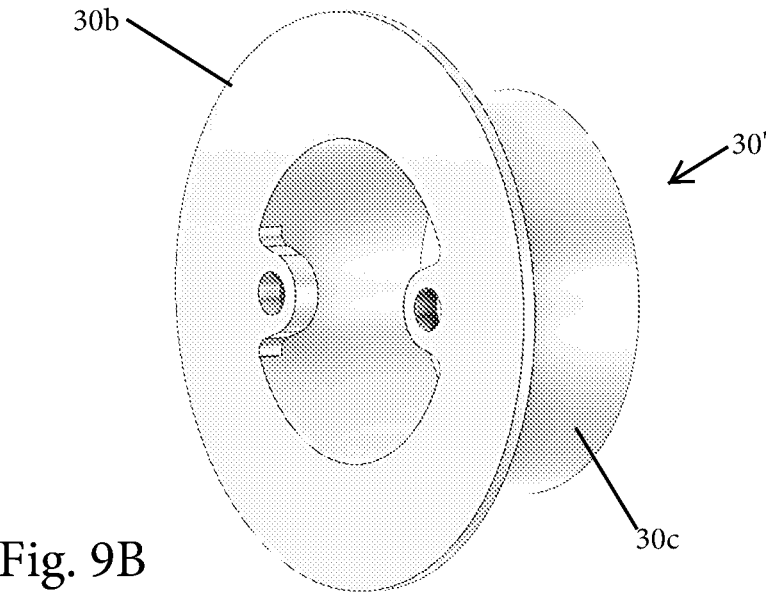
Figure 10:
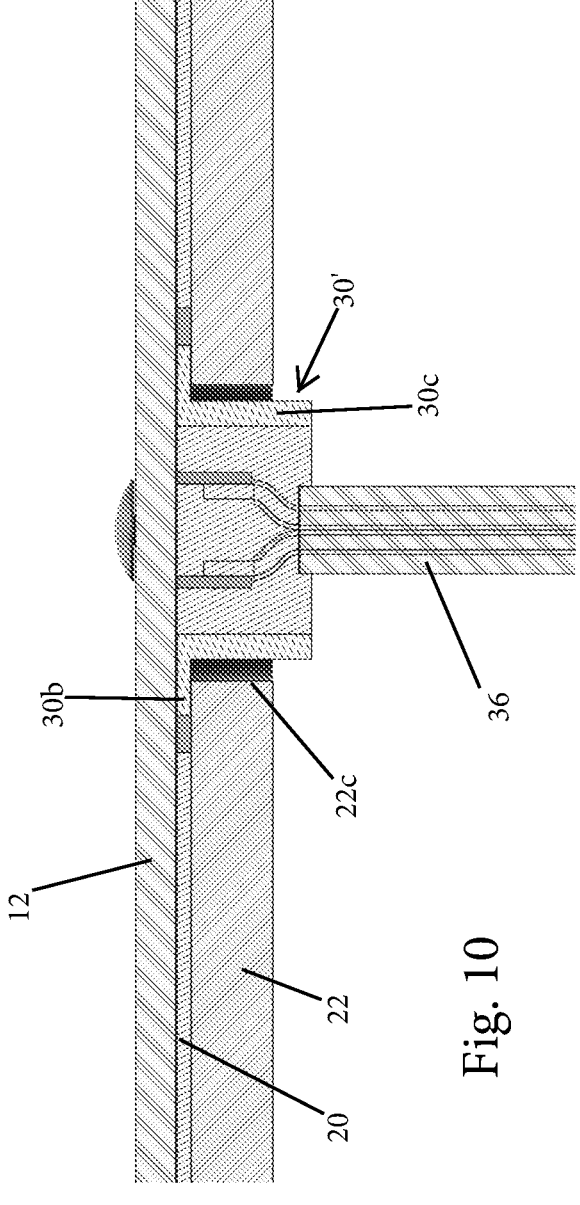
FIG. 10 shows a cross-section of the flexible solar panel assembly utilizing the alternative housing as mounted on a body component of a vehicle.

Although in the above housing 30 the outer perimeter at both ends is defined by the cylindrical body, in other embodiments, per FIGS. 9A and 9B, the housing 30' may include a mount flange or lip 30*b* extending outward from the panel mount end or side of cylindrical body 30*c*. This mount flange or lip 30*b* provides an increased surface area for a sealant between the housing 30' and the rear side of the flexible solar panel, to increase sealing effectiveness and pull-away resistance of the housing 30'. In use, per FIG. 10, the mount flange or lip 30*b* may be larger than the opening 22*c* in the vehicle body component 22, so as to be at least partly sandwiched between the flexible solar panel and the external surface of the vehicle body component, and the mount flange or lip 30*b* may be approximately same thickness as the adhesive tape/film 20, to make the installation of the flexible solar panel assembly more resistant against pulling and bending forces on the cable 36. This results in an even stronger and more watertight connection, with the addition of a sealant/adhesive (e.g., a Chemlok® adhesive) between the mount flange or lip 30*b* and the rear side of the flexible solar panel 12.

The embodiments of the flexible solar panel assembly and electrical junction described above provide robust, low-profile, and low-cost electrical junctions that withstand the rigors of prolonged exposure to the environment and can be implemented with a comparatively small footprint. For example, the housing 30 may have an external perimeter diameter, or in the case of housing 30' the body 30*c* may have an external perimeter diameter, of no more than 1.25 inches, such as no more than 1.0 inches or no more than 0.8 inches. In embodiments, this results in the housing 30, or cylindrical body 30*c* of housing 30', having an external profile that defines a profile area of no more than 1.3 square inches, such as no more than 0.9 square inches, such as no more than 0.8 square inches. In implementations, even with the relatively small sizing of the housing, the unique attachment configuration exceeds the requirements of IEC standards with respect to PV terminations, such as IEC 61215 and/or IEC 60068-2-21. In examples, even with the relatively small sizing, the electrical junction may be resistant to pulling forces of 40 N applied to the junction box cable horizontally and/or perpendicularly.

Other variations of the flexible solar panel assembly and electrical junction are possible. The electrical junction may also be implemented on other substrates, beyond flexible solar panels, including other flexible and rigid substrates.

The invention claimed is:

1. A vehicle and solar panel assembly, comprising:
an outer vehicle body component having an exterior surface, an interior surface and a hole therethrough;
a flexible solar panel having a front side via which light reaches photovoltaic cells of the flexible solar panel, and a rear side, with electrical leads protruding from the rear side, wherein the flexible solar panel is sufficiently flexible to naturally conform to an arcuate surface defined by a radius of curvature of six feet;
a mounting stud that extends from the flexible solar panel such that an attachment portion of the mounting stud projects beyond the rear side of the flexible solar panel and is spaced away from the electrical leads;
a housing having a first side adjacent the rear side of the flexible solar panel, the housing further including:

an opening at the first side through which the attachment portion of the mounting stud projects so as to be positioned within an interior of the housing,
a tab within the interior the housing, the tab receiving the attachment portion of the mounting stud therethrough so as to form a mating connection with the attachment portion of the mounting stud, the housing positioned such that the electrical leads protruding from the rear side of the flexible solar panel pass through the opening at the first side of the housing so as to be received within the interior of the housing, the housing having a second side with a second opening;
a cable extending into the interior of the housing via the second opening, the cable carrying electrical conductors that are electrically connected with the electrical leads via connecting junctions; and
a potting compound located within the interior of the housing and forming adhesive bonds with each of: (i) an interior surface of the housing, (ii) the connecting junctions between the electrical leads and the electrical conductors and (iii) the rear side of the flexible solar panel;
wherein the flexible solar panel is mounted to the outer vehicle body component with the rear side of the flexible solar panel at the exterior surface of the outer vehicle body component and with the housing aligned with the hole such that the housing projects through the hole and the cable extends from the housing at a location behind the outer vehicle body component.

2. The vehicle and solar panel assembly of claim 1, wherein the potting compound further forms adhesive bonds with (i) the mating connection between the attachment portion of the mounting stud and the tab and (ii) an end portion of the cable.

3. The vehicle and solar panel assembly of claim 2, wherein the potting compound is in a cured state that substantially fills the interior space of the housing.

4. The vehicle and solar panel assembly of claim 1, wherein the housing has a housing body, and the housing body has a profile that defines a profile area of no more than 0.9 square inches.

5. The vehicle and solar panel assembly of claim 4, wherein the profile area is no more than 0.8 square inches.

6. The vehicle and solar panel assembly of claim 1, wherein the housing is defined, at least in part, by a cylindrical wall that is open at both ends to define the first opening and the second opening.

7. The vehicle and solar panel assembly of claim 6, wherein the cylindrical wall is of right circular cylinder configuration.

8. The vehicle and solar panel assembly of claim 1, wherein the mounting stud includes a head portion seated against the front side of the flexible solar panel and at least the attachment portion of the mounting stud includes ribbed projections for engaging with an opening of the tab.

9. The vehicle and solar panel assembly of claim 1, wherein the rear side of the flexible solar panel is adhered to the exterior surface of the outer vehicle body component.

10. The vehicle and solar panel assembly of claim 1, wherein the potting compound further forms adhesive bonds with (iv) the mating connection between the attachment portion of the mounting stud and the tab and (v) an end portion of the cable;

wherein the housing has a housing body, defined by a housing wall, and the housing body has a profile that defines a profile area of no more than 0.9 square inches;

wherein the adhesive bonds between the potting compound and each of: (i) the interior surface of the housing, (ii) the connecting junctions between the electrical leads and the electrical conductors and (iii) the rear side of the flexible solar panel are sufficient to resist pulling forces of 40 N applied to the cable.

11. The vehicle and solar panel assembly of claim 1, wherein the housing is spaced from a perimeter of the flexible solar panel and lacks any connection to the perimeter edge of the flexible solar panel.

\* \* \* \* \*